A. M. LANCE.
NUT LOCK.
APPLICATION FILED JUNE 20, 1911.

1,026,812.

Patented May 21, 1912.

WITNESSES
F. E. Gaither
Ellor McConnell

INVENTOR
A. M. Lance
By Geo Nisbit
Atty

UNITED STATES PATENT OFFICE.

ANDREW M. LANCE, OF BATSON, TEXAS, ASSIGNOR OF ONE-HALF TO AMZI F. HAYNIE, OF BATSON, TEXAS.

NUT-LOCK.

1,026,812.  Specification of Letters Patent.  Patented May 21, 1912.

Application filed June 20, 1911. Serial No. 634,356.

*To all whom it may concern:*

Be it known that I, ANDREW M. LANCE, a resident of Batson, in the county of Hardin and State of Texas, have invented certain new and useful Improvements in Nut-Locks, of which the following is a specification.

The primary object of this invention is to provide a simple and reliable nut-locking device that can be readily applied to the various forms of nuts and bolts commonly used, and one which will retain its efficiency after prolonged usage, or after having been removed and reapplied a number of times.

The invention includes a resilient locking member adapted to engage the bolt and nut to lock them firmly together and prevent turning of the former in either direction, and it is characteristic of my device that the nut and bolt engaging members are so arranged with reference to each other that the slightest tendency of the nut to turn upon the bolt in the reverse or unseating direction will cause the locking member to more tightly embrace and engage the bolt, thereby preventing the device from working loose or being injuriously affected, either by a sudden shock or a series of prolonged vibrations.

The invention consists in certain novel features of construction, and in the assemblage and combination of parts, hereinafter fully described and claimed, and illustrated in preferred form in the accompanying drawings, wherein:—

Figure 1:
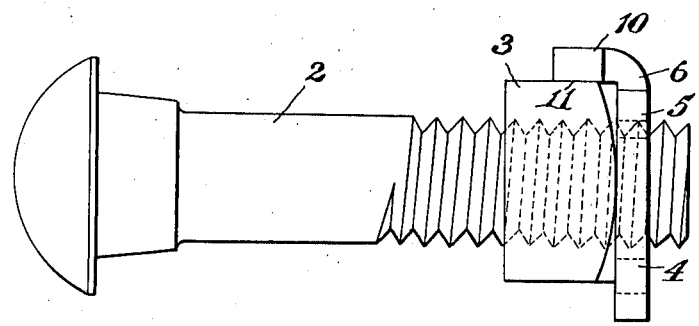
Figure 2:
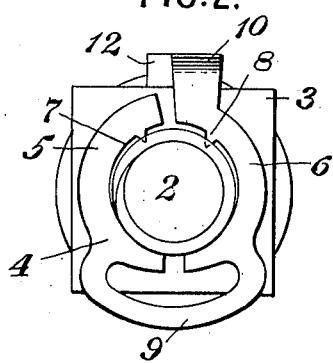
Figure 3:
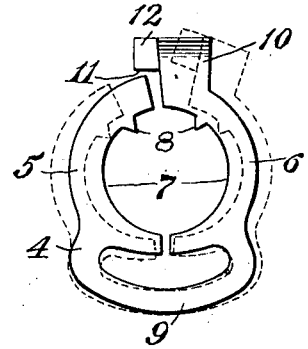
Figure 4:
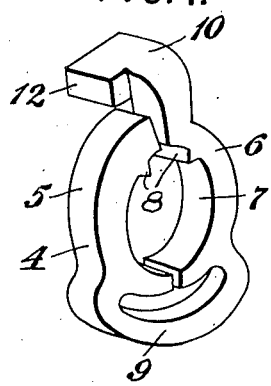

Figure 1 is a side elevation of a nut lock embodying my invention. Fig. 2 an end view of the same with the parts in locked position. Fig. 3 a similar view of the locking member alone, the dotted lines illustrating the manner in which it is spread apart to be placed upon the bolt and nut. Fig. 4 a perspective view of the locking member with the parts in normal position.

Referring to the drawings, 2 is the bolt, 3 the nut, and 4 the locking member. The latter preferably consists of two bolt embracing members or jaws 5 and 6, the adjacent faces of which are curved at 7 to encircle the bolt 3, and are provided with inwardly extending teeth 8, adapted to bite into and grip the threads at opposite sides of the bolt, as shown in Fig. 2. Jaws 5 and 6 have one end extended beyond the periphery of bolt 3 and connected together by a resilient member 9, and their opposite ends closely approach each other but are not connected, thus forming a pair of spring jaws of a length greater than the diameter of the bolt. Arm 6 is extended radially from the jaws and bent over at approximately a right angle to form a nut-engaging member 10. Member 10 has a flat inner face 11 adapted to bear closely against one face of the nut 3 when in operative position, and if desired, such engaging portion may be extended, as shown at 12, to give a greater bearing surface for the nut.

In the operation of my device, after nut 3 has been adjusted upon the bolt, the jaws 5 and 6, which are normally spaced apart a less distance than the diameter of the bolt, are sprung apart, in the position shown by dotted lines in Fig. 3, and the locking member slipped over the bolt and nut until member 10 overlaps the latter. The jaws 5 and 6 are then released and allowed to resume their normal position, forcing face 11 into close contact with nut 3 and teeth 8 firmly against the bolt threads, the length of the jaws, which is greater than the diameter of the bolt, affording the necessary spring action. The flat face 11 of the locking member being in close contact with one of the faces of the nut, the latter is prevented from turning in either direction, and as spring jaws 5 and 6 extend across and beyond the bolt it will be seen that any tendency of nut 3 to turn in the reverse or unseating direction will act to draw jaws 5 and 6 more closely together to tightly embrace the bolt and force teeth 8 more deeply into the threads, thus locking the parts of the device firmly together. Obviously, a reversal of the above operation will release the locking member without in any way impairing its efficiency or unfitting it for future use.

I claim:—

1. A nut lock comprising in an integral structure a pair of jaws spaced apart to embrace a bolt and resiliently connected at one end, one of said jaws being of a greater length than the other with its free end bent at an angle to engage a nut.

2. A nut lock comprising in an integral structure a pair of resiliently connected jaws of a greater length than the diameter of the bolt, said jaws being normally spaced apart a less distance than the diameter of the bolt, with one of said jaws having its free end extended and bent at an angle to engage the nut.

3. A nut lock comprising in an integral structure a pair of resilient jaws of a greater length than the diameter of the bolt, with the inner faces of the jaws curved and normally spaced apart to embrace the bolt, one of said jaws being of a greater length than the other and having its extended portion adapted to engage the nut to prevent its turning upon the bolt.

4. A nut lock comprising in an integral structure a pair of jaws normally spaced apart and provided upon their adjacent faces with teeth to engage a bolt, said jaws being of a greater length than the diameter of the bolt and resiliently connected at one end, with the free end of one jaw bent at an angle to engage a bolt.

5. A nut lock comprising in an integral structure a pair of jaws normally spaced apart to embrace a bolt and of a greater length than the diameter of the bolt, said jaws being resiliently connected at one end and provided upon their adjacent faces with means to engage the bolt, with the free end of one jaw adapted to overlap and engage the nut in position to force the bolt engaging means toward each other when the nut is turned in one direction.

6. A nut lock formed of a single piece of metal and comprising a pair of jaws of a greater length than the diameter of the bolt and resiliently connected at one end, the adjacent faces of said jaws being curved to encircle the bolt and provided with bolt engaging means, with the free end of one jaw radially extended and bent at an approximately right angle to engage a nut.

7. A nut lock formed of a single piece of metal and comprising a pair of jaws normally spaced apart to embrace a bolt and of a greater length than the diameter of the bolt, said jaws being resiliently connected at one end and provided upon their adjacent faces with teeth to engage the bolt, one of said jaws having its free end radially extended and bent at an approximately right angle, with the bent over portion extended to form a flat bearing surface for a nut and engage the latter to draw the jaws toward each other when the nut is turned upon the bolt in one direction.

In testimony whereof I affix my signature in presence of two witnesses.

ANDREW M. LANCE.

Witnesses:
   A. F. HAYNIE,
   J. G. WOFFORD.